E. T. GREENFIELD.
TIRE.
APPLICATION FILED DEC. 9, 1905.
909,180.
Patented Jan. 12, 1909.
2 SHEETS—SHEET 1.
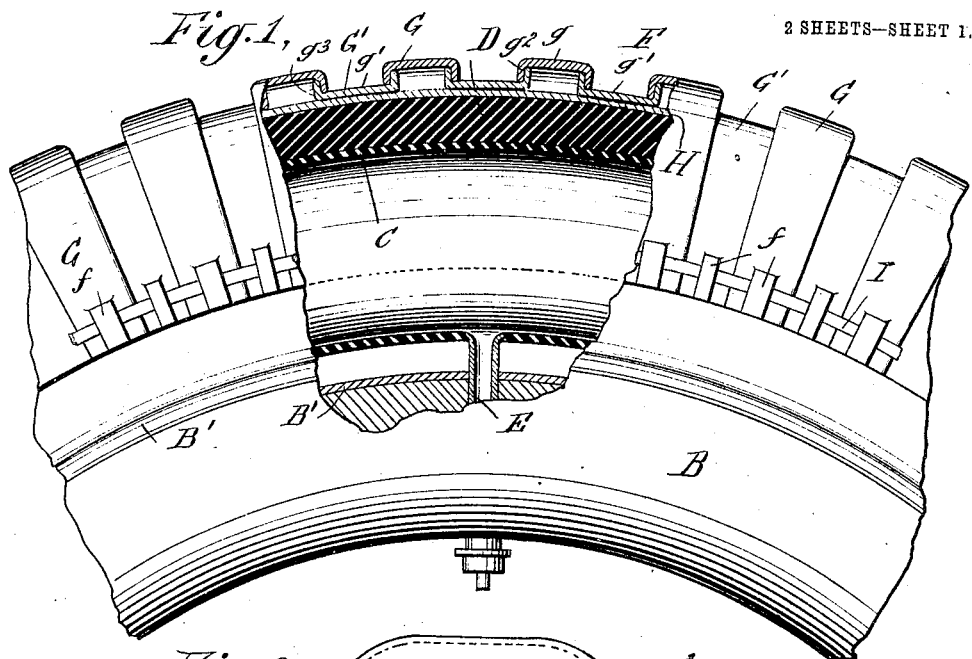
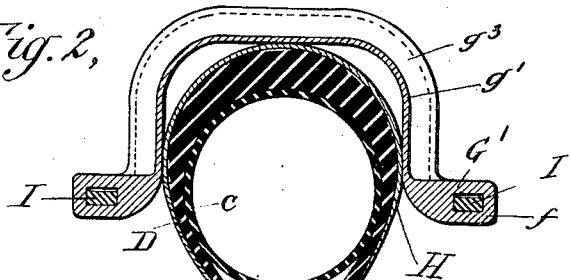
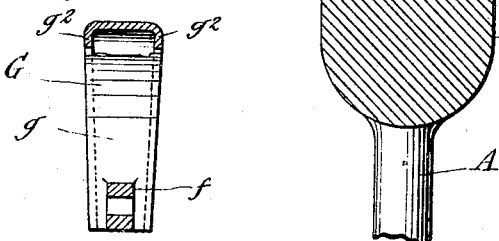 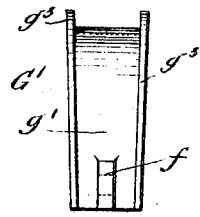
WITNESSES:
INVENTOR
Edwin T. Greenfield
BY
ATTORNEY E. T. GREENFIELD.
TIRE.
APPLICATION FILED DEC. 9, 1905.
909,180.
Patented Jan. 12, 1909.
2 SHEETS—SHEET 2.
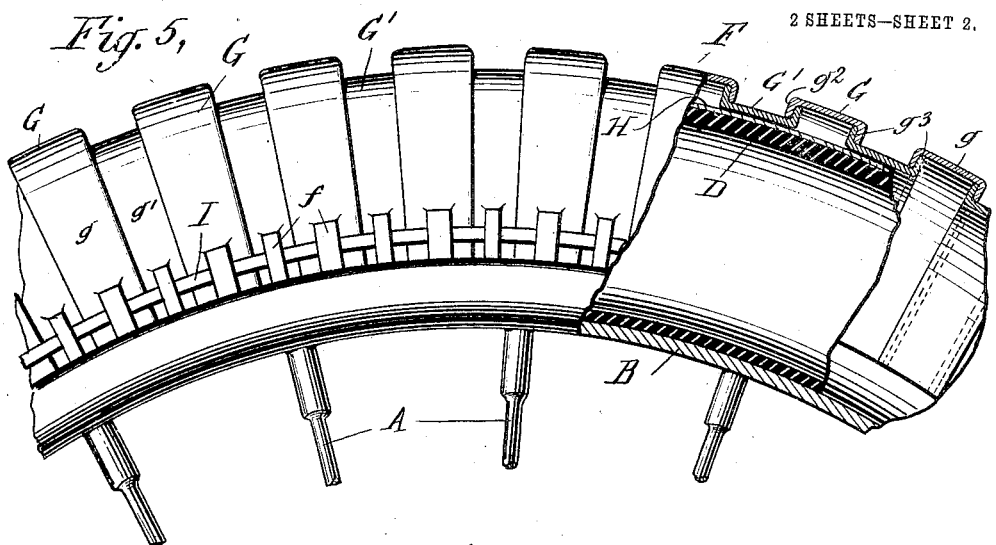
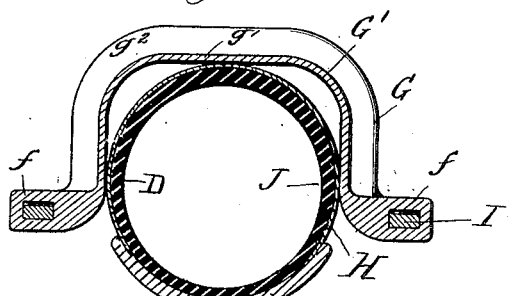
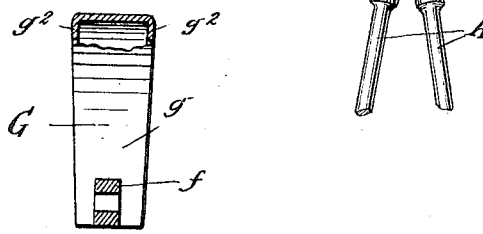
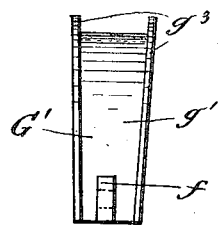
WITNESSES:
INVENTOR
Edwin T. Greenfield
BY
J. C. Edmonds
ATTORNEY

UNITED STATES PATENT OFFICE.

EDWIN T. GREENFIELD, OF KIAMESHA, NEW YORK.

TIRE

No. 909,180.    Specification of Letters Patent.    Patented Jan. 12, 1909.

Application filed December 9, 1905. Serial No. 291,084.

*To all whom it may concern:*

Be it known that I, EDWIN T. GREENFIELD, a citizen of the United States, residing at Kiamesha, in the county of Sullivan and State of New York, have invented certain new and useful Improvements in Tires, of which the following is a specification.

This invention relates to tires for the wheels of vehicles and particularly such resilient tires as are commonly employed on the wheels of automobiles.

One of the objects of the invention is to provide an improved tire the elastic portion whereof, which is preferably made of rubber or other suitable flexible material and inflated, is fully protected against abrasion and puncture, and this without sacrificing to any material extent the resiliency of the tire as a whole.

Another object of the invention is to provide a tire having an exterior casing so constructed that it presents a surface which will grip the roadway and thus prevent slipping and skidding more effectually than has been the case with the tires heretofore used.

In accordance with my invention, I provide a suitable resilient single or double tube, as of rubber or of rubber and a woven fabric, and over this a protecting casing consisting of a plurality of metallic plates extending partially around such tube and each interlocking with and movable relatively to the plates adjacent thereto. Preferably the plates of this casing are sustained by metallic bands or rings which engage the plates near the ends thereof and assist in holding them in proper relation. The metallic casing thus constructed forms the entire tread of the tire, there being no spaces between the metallic plates in which the tube is exposed, and therefore furnishes ample protection for the tube against abrasion. The individual plates of the metallic casing are comparatively narrow and as each is movable relatively to the adjacent plates the complete tire is quite as flexible and resilient as is necessary to afford easy running of the vehicle. The interlocking of the plates is effected in such a manner that transverse ridges are provided over the entire tread of the tire forming gripping walls which serve to prevent slipping and skidding. The resilient tube may be of any of the types now commonly employed, either single or double and arranged for inflation with air or not as desired. Instead, however, I may use a tube formed from a length of straight flexible tubing by joining the ends thereof to the ends of a short section of similar tubing having a valve connection, since a tire made in this manner from lengths of straight tubing is much less expensive.

I have illustrated preferred embodiments of my invention in the accompanying drawings, in which—

Figure 1 is a sectional elevation and Fig. 2 a transverse section of a tire, Figs. 3 and 4 are detail views of two of the interlocking plates, and Figs. 5, 6, 7 and 8 are views similar to those of Figs. 1, 2, 3 and 4, respectively showing a slightly modified form of tire.

Referring first to Figs. 1 to 4, A represents the spokes and B the felly of the wheel around which is a rim or hoop B' which supports the tire. In these figures I have shown a double-tube tire of the clencher type consisting of an inner tube C and an outer tube or shoe D, the latter having flanges $d$ at its edges which interlock with flanges $b$ on the hook B' to hold the tire thereon. A valve E is sealed into the inner tube C and extends through the hoop B' and felly B in the usual manner to permit of inflating the tire. Overlying the outer tube D is a flexible protective casing F consisting of narrow interlocking metallic plates. As shown in the drawings the plates of this casing are of two types alternating with each other throughout the length of the casing. Each of the plates G (Fig. 3) of one of these sets has a body portion $g$ tapering slightly at the ends and bent intermediate the ends so that these tapering ends lie substantially parallel to each other. At each side of the body portion is an inturned flange $g^2$, $g^2$. Each of the plates G' (Fig. 4) of the other set has a body portion $g'$ tapered at the ends and bent similarly to the plates G. At the sides of the plates G' are flanges $g^3$, $g^3$, which are turned outwardly. The extent of the taper of the plates G and G' is such that when the plates are assembled and the casing applied to the inflated tube, the planes of the sides of the several plates include radii of the circle of the wheel. The plates are bent to a U shape instead of an arc shape to correspond to the curvature of the tire, so that under normal conditions there are spaces between the shoe D and the interior of the casing into which the shoe may fill when the plates are depressed. To prevent injury to the shoe D due to rubbing on the ends of the plates G and G' as they are moved radially by obstructions in the roadway, I employ a guard-strip or covering H of leather or similar suitable material over the shoe D, its edges being held in any suitable manner as by passing them under the flanges $b$ on rim B'. On the exterior of each of the plates G and G' at each end thereof is a lug $f$ having an opening therethrough.

The plates G and G' are assembled alternately to form the casing F with the inturned flanges at the sides of each plate G overlying and interlocking with the outwardly-turned flanges on the sides of the two plates G' adjacent thereto. A suitable binder I is then passed through the openings in the lugs $f$ on each side of the several plates G and G'. These may be flexible rods or lengths of strong wire and are preferably somewhat smaller in cross-section than the openings in the lugs $f$ so that slight radial movement of the plates is permitted without flexing the binders. When sufficient plates G and G' have been assembled to form the complete casing, the end plates G and G' are interlocked and the binding wire I on each side is drawn taut and its ends secured together. The casing may then be applied to the wheel over the shoe D and cover H thereon while the inner tube C is deflated and the latter may then be inflated in the usual manner, whereupon the casing will fit closely over the shoe D. The interlock between the plates of the casing is such that each plate may move relatively to the plates adjacent thereto and the metallic casing does not lessen the flexibility and resiliency of the complete tire to any material extent. As the plates of the casing are of metal, preferably malleable iron or steel, and form the entire tread of the tire, the tubes C and D are fully protected against abrasion and puncture. It will also be observed that transverse ridges are formed over the tread of the tire which serve to prevent slipping and skidding.

In Figs. 5, 6, 7 and 8, I have illustrated an embodiment of my invention similar to that shown in Figs. 1 to 4, except that a single tube construction is shown instead of double. In this case the felly B of the wheel or a hoop thereon, instead of being substantially flat with flanges at the sides, is curved to conform to the curvature of the tube when inflated, and the tube rests upon this hoop and is confined by its upwardly extending sides. The single tube, indicated at J, may be thickened at its tread if desired but need not be of as great thickness at any part thereof as has been considered necessary heretofore on account of the protection afforded by the casing F. The covering H of leather may also be employed to advantage in this case, it being held in position by inserting its edges between the tube and the rim of the wheel.

Having now described my invention, what I claim as new therein and desire to secure by Letters Patent is as follows:—

In a tire, the combination of a circular elastic portion, a strip of flexible material overlying the same, and a protective casing overlying said strip consisting of a plurality of metallic plates having flanges at their lateral edges serving to interlock each plate with the plates adjacent thereto and permit relative movement of adjacent plates and bands coacting with the ends of the plates, each of said plates extending across said portion and along the sides thereof and being bent to provide spaces between said portion and the casing into which the former may fill when the tire is depressed, substantially as set forth.

This specification signed and witnessed this 7th day of December, 1905.

EDWIN T. GREENFIELD.

Witnesses:
W. S. EDMONDS,
I. McINTOSH.